Figure 1:
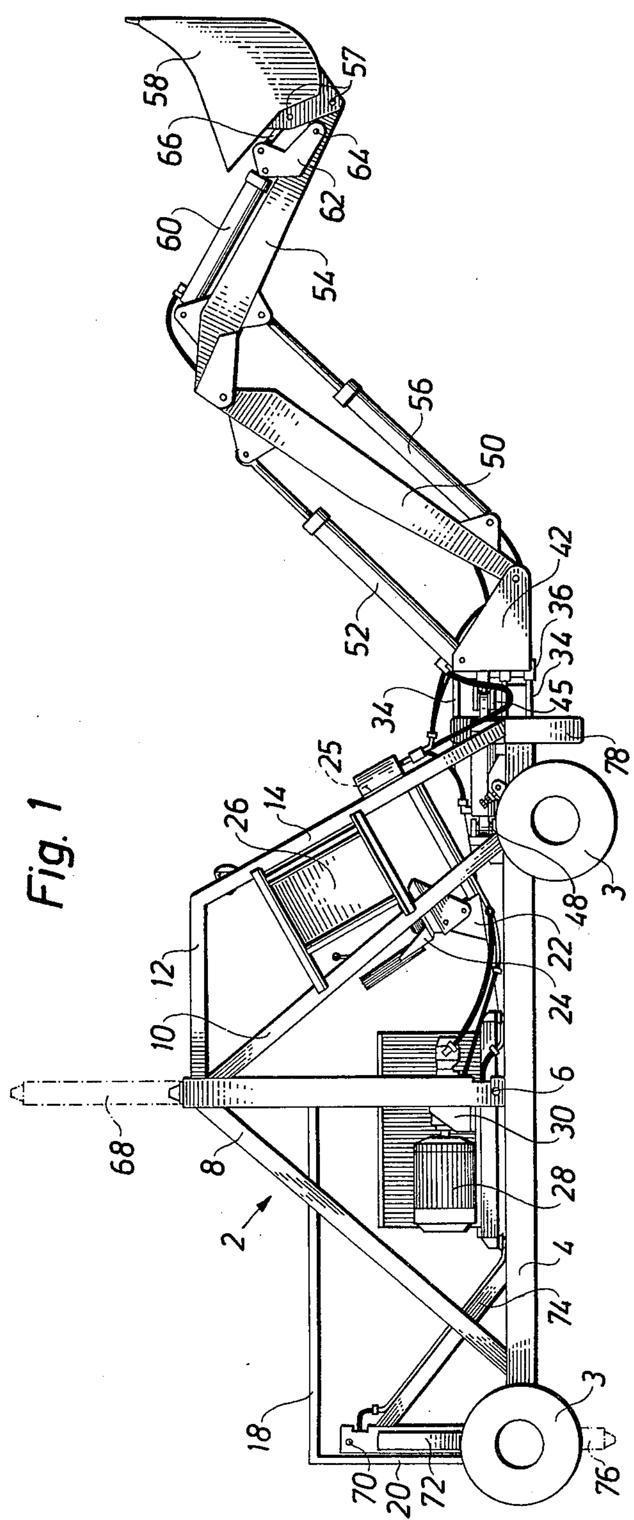

United States Patent [19]

Thorsell

[11] 3,991,886

[45] Nov. 16, 1976

[54] SHAFT MUCKER

[75] Inventor: Torgny Thorsell, Skelleftea, Sweden

[73] Assignee: Linden-Alimak AB, Skelleftea, Sweden

[22] Filed: Aug. 5, 1974

[21] Appl. No.: 469,667

[30] Foreign Application Priority Data

May 13, 1974 Belgium .............................. 144253

[52] U.S. Cl. ........................... 214/1 MS; 214/90 R; 214/138 R

[51] Int. Cl.² .......................................... B65G 67/04

[58] Field of Search ............ 214/138, 131, 132, 41, 214/1 MS, 1 D, 90 R, 138 C; 299/18, 33; 212/145; 280/150.5

[56] References Cited

UNITED STATES PATENTS

| | | | |
|---|---|---|---|
| 1,644,943 | 10/1927 | Osgood | 299/33 |
| 2,157,736 | 5/1939 | Dooley et al. | 214/132 |
| 3,003,787 | 10/1961 | Woolslayer et al. | 280/150.5 |
| 3,064,825 | 11/1962 | Thomas | 212/145 |
| 3,269,566 | 8/1966 | Huelsdonk | 214/41 |
| 3,547,287 | 12/1970 | Cunningham, Sr. | 214/90 R |
| 3,578,188 | 5/1971 | Drieschner | 214/138 |
| 3,851,481 | 12/1974 | Swoager | 214/90 R |

FOREIGN PATENTS OR APPLICATIONS

| | | | |
|---|---|---|---|
| 684,904 | 1/1967 | Belgium | 214/138 C |
| 1,484,699 | 4/1969 | Germany | 214/132 |

*Primary Examiner*—L. J. Paperner
*Assistant Examiner*—Ross Weaver

[57] ABSTRACT

A mucker for declined shafts supported on non-trackbound wheels and including a mucking assembly pivotally supported at the forward extremity of the machine frame and carrying a bucket for transverse pivotal movement for loading a skip. The mucker includes a built-in winch, and legs hydraulically extendable to the hanging wall and foot wall for anchoring purposes.

12 Claims, 7 Drawing Figures

68 10 12 8 2 18 26 14 25 60 66 58 70 20 72 34 52 54 62 64 57 56 50 74 4 28 30 6 24 22 48 3 78 45 34 36 42 76 3

90
78
68
76
82
81
84
86
80
94
88
92

112
110
76
VII
VII

SHAFT MUCKER

The present invention relates to a shaft mucker, particularly adapted for mucking in declined shafts.

In mining of minerals, particularly coal and ore, the veins are usually followed, the inclination and declination of which may vary to a large extent. It is then a problem to load and remove in an efficient and economic manner the material mined from a shaft, following a declined vein, since such a shaft may in many cases be very narrow and the declination thereof rather large.

The loading is usually performed by means of so-called shaft muckers into skips running on rails and driven by means of cables. Since the mucking methods utilized up to the present involve that the frame of the mucker is moved reciprocally for each bucket loaded and the area closest to the end of the shaft as a rule contains much water, the mucker is exposed to abnormal wear in the sludge formed, which is mixed up of rock, earth, sand and water. In earth layers or loose rock the shaft foot wall will also be destroyed during such mucking.

One object of the invention has been to provide a shaft mucker, adapted for mucking in narrow and steep declined shafts, and allowing the utilization of a novel mucking method, substantially reducing the wear of the mucker and of the damageable shaft footwall.

According to the invention a mucker adapted for mucking in declined shafts comprises an elongated machine frame, a hydraulically operated mucking assembly, comprising a bucket, and pivotally supported at one end of the frame so as to allow a pivoting movement of the bucket between a substantially forwardly directed and a substantially laterally directed position relative the machine frame at one side of the machine, and anchoring means for anchoring the machine against the walls of the shaft during mucking.

The mucker is anchored in one and the same position in the shaft during the removal of all or a substantial portion of a blasting charge, while the hydraulically movable mucking arm with the bucket is moved reciprocally, and laterally for filling of the skip, without damaging the shaft footwall and without exposing damageable joints or other parts to abnormal wear in the sludge at the end of the shaft.

The shaft mucker and the skip are located substantially beside each other during the mucking, which means that the shaft mucker is operating adjacent one of the side walls of the shaft. It is therefore suitable that the angle between the laterally directed pivoting position and the longitudinal direction of the loader is at least 90° and the substantially forwardly directed pivoting position is located a small distance on the opposite side of the mucker and forms an angle of, e.g., about 10° with the longitudinal direction of the machine. Preferably, the first-mentioned angle may be of the order of magnitude of 100° and the sum of the angles of the order of magnitude of 120°.

Said anchoring members may comprise hydraulically operated support legs, which can be extended and withdrawn hydraulically so as to be brought into or from contact, respectively, with the shaft walls. The support legs may comprise at least one leg for engaging the hanging wall, arranged at the middle portion of the machine frame, and at least one leg for engagement with the foot wall, arranged at the end of the frame remote from the mucking assembly, and, finally, a fixed support may be arranged at the end of the frame carrying the mucking assembly, said support being brought into engagement with the foot wall by tilting the machine frame slightly forwards by means of the hydraulic support legs. Hereby a steady anchoring of the machine in the shaft is obtained as well as an unloading of the wheels thereof.

According to one particularly advantageous embodiment the frame may support a winch drum, drivable and operable from the machine, for driving the mucker in the shaft by means of cable drive. The other end of the cable may then be anchored at the beginning of the declined shaft.

Figure 2:
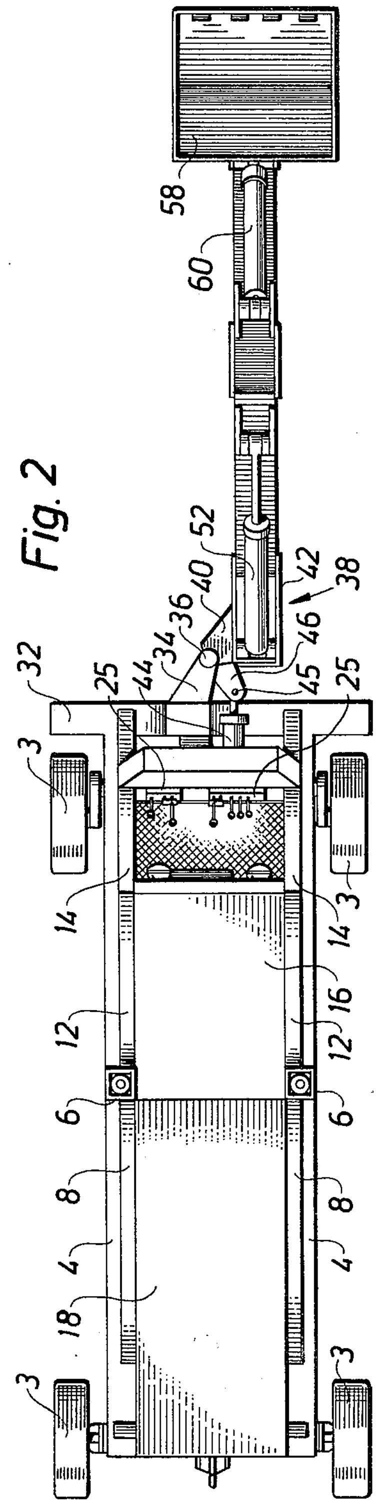

The invention and the advantages thereof will now be described more closely with reference to a few embodiments, illustrated on the attached drawings, wherein FIGS. 1 and 2 schematically illustrate a side view and a plan view, respectively, of a first embodiment of the shaft mucker according to the invention.

Figures 3, 4:
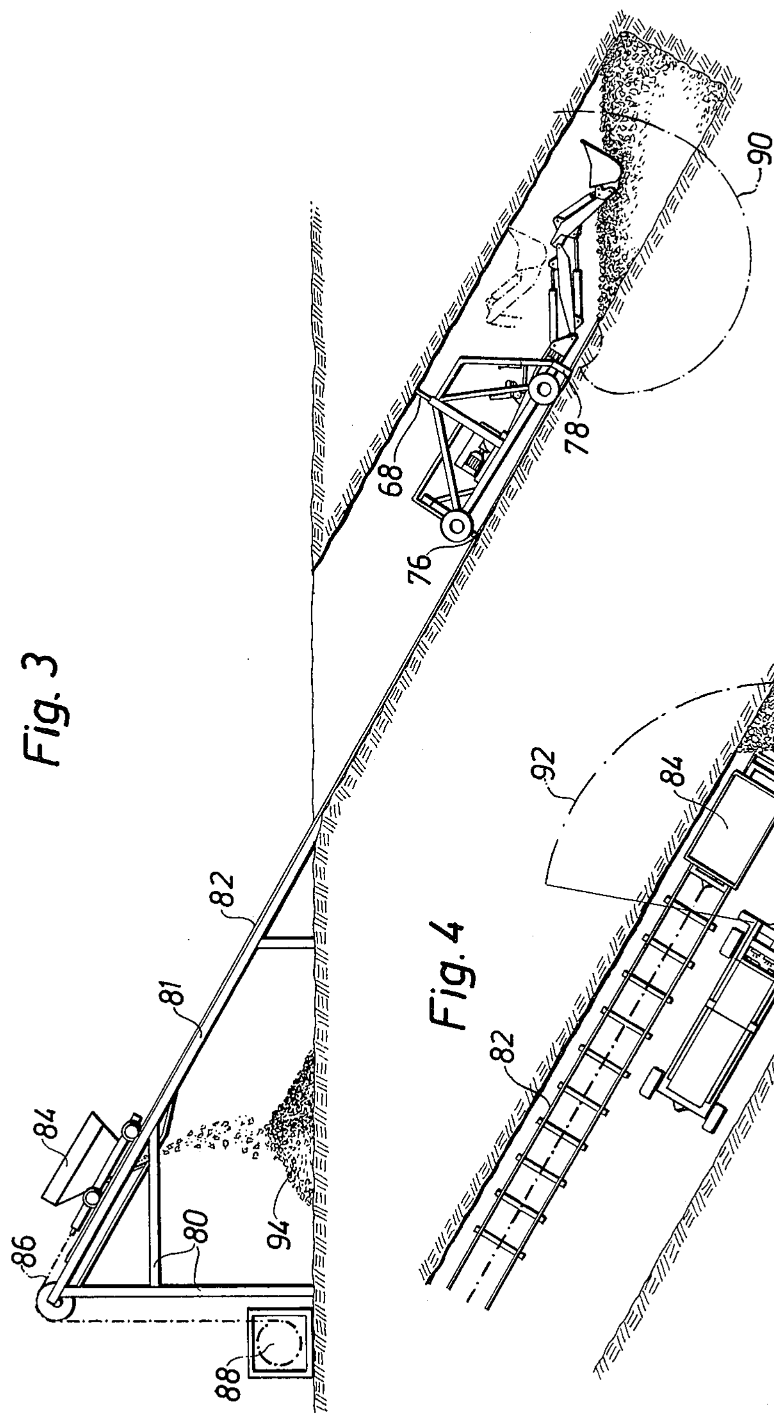

FIGS. 3 and 4 in side view and plan view, respectively, through a declined shaft illustrate the method of operating the mucker according to FIG. 1 and 2 during mucking.

Figure 5:
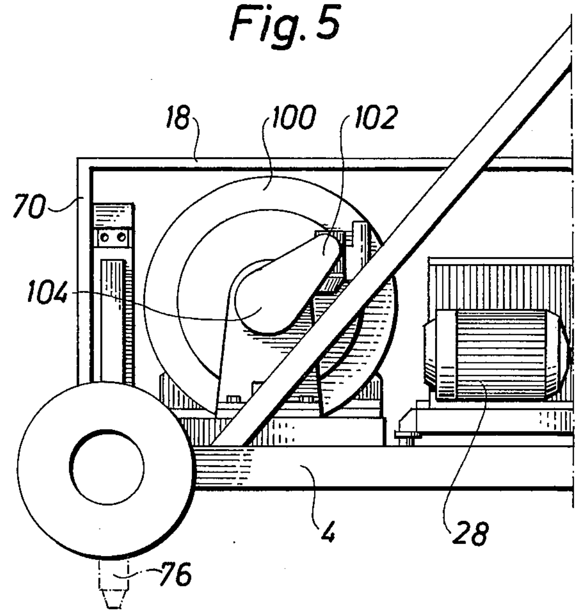

FIG. 5 illustrates a modified embodiment of the machine according to FIGS. 1 and 2.

Figure 7:
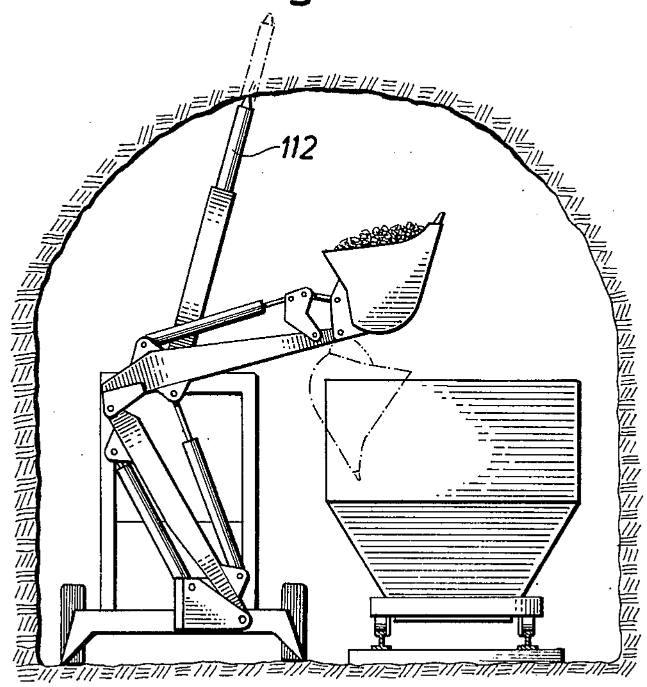
Figure 6:
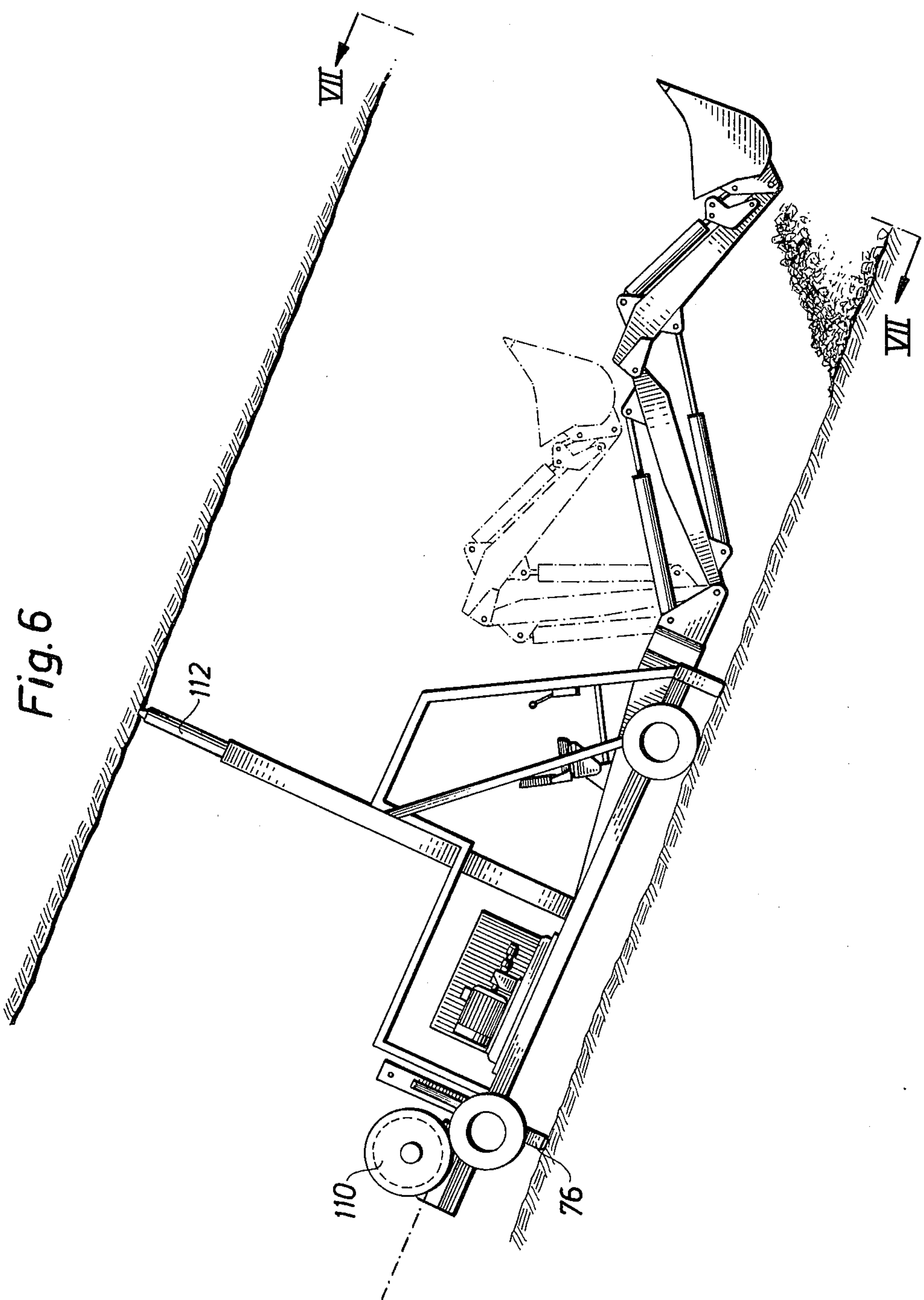

FIG. 6 schematically and in side view illustrates a further embodiment of the shaft mucker according to the invention in a view similar to FIG. 3, and FIG. 7 shows a section in the direction of the arrows VII—VII in FIG. 6 through the shaft, illustrating the mucker in a front view with the mucking assembly in another working position than in FIG. 6.

In FIG. 1 a frame structure of the mucker is generally referenced 2. The frame structure 2 comprises an elongated, rectangular frame with supporting wheels 3 and substantially built up of longitudinal side box girders 4 and transversal box girders interconnecting said side girders. Of the transversal girders only the girders located at the ends of the frame are visible in FIGS. 1 and 2. The frame structure further comprises two upright box girders 6, located approximately at the centre of one each of the side girders 4 and each stayed by two oblique box girders 8 and 10, respectively. From the upper end of each of the upright box girders 6 one box girder 12 extends in parallel to the girders 4 and is stayed at the forward end thereof by a box girder 14 extending down to the forward end of the frame structure.

Between the girders 12 a guard plate 16 is secured and between the upper portions of the girders 6 another guard plate, not visible in FIGS. 1 and 2, is secured. From the last-mentioned guard plate a rear guard plate 18 extending in parallel with the girders 4 projects over the rear half of the machine, the last-mentioned guard plate being terminated by a transverse end guard plate 20. Adjacent the front end thereof the frame on a support 22, not shown in detail, carries a seat 24, the inclination of which may be adjustable between 10° and at least 30°, preferably 50° relative the horizontal plane. Between the girders 14 a control panel 25 is supported forwardly of the seat 24. The control panel 25 may be of a conventional type as used in bucket loaders and from this panel the various functions of the machine may be controlled. Between the girders 10 and 14 a side guard plate 26 is provided to guard the operator.

On the bottom of the frame structure 2 a driving assembly for the various functions of the machine is supported, comprising an electric motor 28 of, e.g., 40 HP, which drives a hydraulic pump 30, supplying a maximum pressure of, e.g., 120 kp/cm$^2$. FIG. 1 further illustrates a number of hydraulic conduits, not described more closely, which lead to and from the control panel and to the various hydraulically operated working functions.

A forward, sturdy transverse girder 32 of the frame structure carries a forwardly and rightwardly directed forkshaped support 34 for a pivot shaft 36 extending perpendicularly relative the plane through the girders 4.

A support structure, generally referenced 38, for a hydraulically driven mucking assembly, described more closely below, is pivotally supported around the pivoting shaft 36. Thus, the support structure 38 comprises arms 40, pivotally supported on the shaft 36, said arms carrying a box structure 42, forming a support for the operating beam and bucket arm of the mucker, described more closely below, and appurtenant hydraulic cylinders. The end of the piston rod of a hydraulic cylinder 44 is pivotally supported around a pivot 45 between fork-like projections 46, forming part of the support structure 38, and the opposite end of said hydraulic cylinder is pivotally supported at 48 in the frame structure of the machine. As illustrated, the piston of the hydraulic cylinder 46 is nearly completely withdrawn in the position of the support structure 38 illustrated in FIG. 2, which means that the mucking assembly described more closely below from the position thereof, illustrated in FIG. 2, can only rotate slightly further to the right in FIG. 2.

The box structure 42 at the front end thereof carries a pivotally supported loading beam 50 of sturdy box construction, which is operated by a hydraulic cylinder 52 to pivot in the vertical plane. The beam 50 at the free end thereof pivotally carries a bucket arm 54, which is also of sturdy box construction. The arm 54 is operated relative to the beam 50 for pivoting in the same plane as said beam by means of a hydraulic cylinder 56 acting between the foot end of the beam 50 and the arm 54. The arm 54 at the free end thereof at 57 pivotally carries a bucket 58, which is operated by means of a hydraulic cylinder 60, pivotally supported between a pivot adjacent the other end of the arm 54 and a link mechanism, connected with the bucket 58. This link mechanism comprises parallel arms 62, operated by the hydraulic cylinder 60, said arms being pivotally supported on the arm 54 at 64 and actuating the bucket 58 via an arm 66, which is pivotally connected with the link arms 62 and the bucket.

In each beam 6 a hydraulically withdrawable and extendable support leg 68 is provided, which is illustrated with dotted lines in FIG. 1 in an extended position.

The rear end of the machine frame further carries a box girder 70 in parallel with the girder 6, said girder 70 being supported by three oblique support girders, two of which, viz. 72 and 74, are visible in FIG. 1. The girder 70 contains a support leg 76, which is hydraulically withdrawable and extendable in a downward direction.

The details of the hydraulic mechanism for withdrawing and extending the support legs 68 and 76 should be evident for a person skilled in the art and thus need not be described more closely here.

In the exemplary embodiment shown the support legs 68 and 76 are adapted to cooperate in a manner described more closely below with a frontal transverse support girder 78, which forms part of the frame girder 32.

FIGS. 3 and 4 illustrate more closely how the mucking of a shaft charge may be performed in a declined shaft by means of the shaft mucker according to the invention.

On a structure 80, forming a declined plane 81, rails 82 are provided, which extend along the declined plane and on the shaft foot wall. A skip 84 is provided on the rails and can be drawn up and down by means of a cable, indicated at 86, which is driven by a winch 88. The shaft mucker is driven by another cable winch, not shown in detail, beside the rails. Before the mucking is started, the shaft mucker is securely anchored in the shaft by extending the support legs 68 and 76 in such a manner that the support girder 78 is securely supported by the shaft foot wall and the wheels of the mucker are unloaded. The mucking is performed by moving the bucket forwardly, causing it to perform a loading movement, withdrawing it and moving it laterally to be emptied into the skip 84. The covering range and area of the bucket is shown by the arcuate line 90 in FIG. 3 and the circle sector 92 in FIG. 4, respectively. In practice the maximum distance to the line 90 can be, e.g., of the order of magnitude of 4 m and the circle sector 92 enclose an angle of about 120°, of which 10° – 20° are situated to the right side of the longitudinal direction of the shaft mucker.

When the skip 84 has been fully loaded, it is winched up to the position shown in FIG. 3 and can be emptied at a stockpile 94 for further transport by train or truck.

It should be easily understood that the method of operation illustrated in FIGS. 3 and 4 is advantageous, since the damageable shaft foot wall is saved to the largest extent possible and in addition damageable joints or other portions of the mucker are not exposed to the abnormal wear experienced in prior muckers, in the sludge normally appearing at the shaft end.

In the description above in connection with FIGS. 3 and 4 it has been assumed that the movement of the mucker to and from the site of operation in the longitudinal direction of the shaft is performed by means of a cable winch and a winch drum, not shown in detail, located at the opening of the shaft. According to the embodiment illustrated in FIG. 5, however, the winch drum may be situated on the frame structure of the shaft mucker and may be driven and operated from the machine. Thus, in FIG. 5, the winch drum proper is referenced 100, and may be either directly driven by a slow hydraulic motor arranged in the gable of the drum, or be conventionally driven by an electric motor via a gear.

A gear for driving a cable spreader and/or an instrument for indicating unreeled cable length is indicated at 102 and a chain transmission is indicated at 104. The above mentioned devices such as slow hydraulic motor, electric motor gear, cable spreader, instrument for indicating . . . , and chain transmission may be of a conventional design known per se, and are therefore not disclosed in detail here.

The capacity of the winch drum may be, e.g., about 75 m of cable, the maximum load may be of the order of magnitude of 5 tons and the velocity may be varied between 0 and 10 m per minute.

In operation the end of the cable is anchored at the entrance of the shaft, whereafter the shaft mucker is self-propelled.

FIGS. 6 and 7 schematically illustrate an embodiment of the shaft mucker, which principally only differs from the embodiment according to FIGS. 1, 2 and 5 in a somewhat different position of the winch drum, referenced 110, and another design of the support legs. This machine thus comprises a rear support leg 76, but only one central support leg 112, which in addition has the lateral inclination illustrated in FIG. 7. The last-mentioned arrangement is particularly suitable for use in shafts with a curved hanging wall as shown in FIG. 7.

The design of the shaft mucker according to the invention allows for a relatively low height and small width of the machine which is of particular importance for operation in narrow shafts. Generally the ratio between the maximum length and width, and maximum length and height of the machine, respectively, excluding the mucking assembly, is of the order of magnitude of 5:2 and 2:1, respectively, and the maximum operating range of the mucking assembly is o the same order of magnitude as the length of the machine frame. In practice the maximum width of the mucker may be as small as 2 m, the maximum height with the support legs withdrawn about 2.7 m and the minimum length with the bucket completely withdrawn about 7 m. The bucket volume may be of the order of magnitude of 600 – 750 l.

The design also allows that the shaft loader can be used in shafts with as large declinations as down to about 60°.

What we claim is:

1. In a shaft mucker for mucking in declined shafts comprising an elongated machine frame having a fore end and a rear end, non-track-bound wheels attached to said frame for carrying and supporting said frame and said mucker upon the foot wall of a declined shaft, a mucking assembly and a bucket carried by said mucking assembly, a pivotal support means arranged substantially perpendicularly to the machine supporting foot wall at the forward extremity of said fore end of said machine frame for pivotally supporting said mucking assembly, means for pivotally moving said mucking assembly and said bucket transversely about said pivotal support means, said mucking assembly including means for extending and retracting and for raising and lowering said bucket with respect to said frame, anchoring means comprising support legs hydraulically extendable and withdrawable in the machine frame for anchoring the machine against the walls of the shaft during mucking and including at least one leg for engagement with the hanging wall of the shaft and at least one leg for engagement with the shaft foot wall, a winch drum mounted at the rear end of said machine frame, means for driving and operating said winch drum from said mucker for controllably lowering the mucker into a declined shaft and for raising the mucker by means of an associated cable.

2. A mucker according to claim 1 wherein said mucking assembly is laterally offset with respect to said pivotal support means to provide for a transverse pivoting movement of said mucking assembly and said bucket about said pivotal support means between a substantially forwardly directed and a substantially laterally directed position relative to said machine frame at one side of said machine frame.

3. A mucker according to claim 2, wherein the angle between the laterally directed pivoting position and the longitudinal direction of said frame is at least 90°, and the substantially forwardly directed pivoting position is located on the other side of said frame and forms an angle of the order of magnitude of 10° with the longitudinal direction of said frame.

4. A mucker according to claim 3, wherein the first-mentioned angle is at least of the order of magnitude of 100°.

5. A mucker according to claim 4, wherein the sum of the angles is of the order of magnitude of 120°.

6. A mucker according to claim 2 wherein said means for pivotally moving said mucking assembly and said bucket comprises a hydraulic motor pivotally mounted between said machine frame and an operating arm connected with said mucking assembly.

7. A mucker according to claim 1, wherein said anchoring means also comprise a fixed support at the end of said frame carrying said mucking assembly, said fixed support being brought into engagement with the shaft foot wall by tilting said frame by means of said hydraulic support legs.

8. A mucker according to claim 1, wherein said drum driving means is a direct drive comprising a slow hydraulic motor arranged in the gable of the drum.

9. A mucker according to claim 2 including an operator's seat which is inclinable between 10 and at least 30°, preferably 50°, relative to the plane of the machine supporting foot wall.

10. A mucker according to claim 2, wherein said machine frame is supported by wheels, and wherein the ratio between the maximum length and width, and maximum length and height of the machine, respectively, excluding the mucking assembly, is of the order of magnitude of 5:2 and 2:1, respectively, and the maximum operating range of the mucking assembly is of the same order of magnitude as the length of the machine frame.

11. The combination according to claim 1 wherein said wheels comprise two paris of wheels, one at said rear end and one at said fore end of said machine frame, said pivotal support means being located ahead of the wheel pair at the fore end on a low level.

12. The combination according to claim 7 wherein said support legs comprise two legs for engagement with the hanging wall of the shaft located side by side intermediate said fore and rear ends, and one leg for engagement with the shaft foot wall located at said rear end of the machine frame.

* * * * *